US012241605B2

(12) United States Patent
Fischer et al.

(10) Patent No.: US 12,241,605 B2
(45) Date of Patent: Mar. 4, 2025

(54) METHOD FOR CONSTRUCTING AN OPTICAL FUNCTIONAL UNIT

(71) Applicant: Hella GmbH & Co. KGaA, Lippstadt (DE)

(72) Inventors: Bernd Fischer, Altenbeken (DE); Thorsten Kleinelümern, Langenberg (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 18/768,596

(22) Filed: Jul. 10, 2024

(65) Prior Publication Data

US 2025/0020297 A1 Jan. 16, 2025

(30) Foreign Application Priority Data

Jul. 14, 2023 (DE) ........................ 102023118666.3

(51) Int. Cl.
*F21S 41/29* (2018.01)
*F21S 41/19* (2018.01)
*F21S 43/27* (2018.01)

(52) U.S. Cl.
CPC ............ *F21S 41/192* (2018.01); *F21S 41/29* (2018.01); *F21S 43/27* (2018.01)

(58) Field of Classification Search
CPC .. F21S 41/29; F21S 41/47; F21S 41/55; F21S 43/27; F21S 43/37; F21S 43/51
See application file for complete search history.

(56) References Cited

U.S. PATENT DOCUMENTS

2023/0160554 A1* 5/2023 Fischer .................. F21S 41/43
362/459

FOREIGN PATENT DOCUMENTS

DE 102006005299 A1 8/2007
DE 102009035564 A1 2/2011
DE 102016116122 A1 3/2018
DE 102021116638 A1 * 12/2022 ........... B23K 26/032

* cited by examiner

*Primary Examiner* — Sean P Gramling
(74) *Attorney, Agent, or Firm* — Husch Blackwell LLP

(57) ABSTRACT

A method is provided for constructing an optical functional unit that has an optical component. The optical component has a surface, on which an opaque coating is applied, through which light passes. Portions of the opaque coating are removed from the surface forming at least one window through which the light from at least one light source can pass. A frame is provided that has at least two reference points. The optical component is placed on the frame. The reference points are detected on the frame with an optical sensor. The positions of the windows are calculated on the surface through which light passes in relation to the reference points with a control unit. Portions of the opaque coating are removed using a laser beam source to create the at least one window. The light module is placed in alignment with the reference points on the frame.

10 Claims, 5 Drawing Sheets

METHOD FOR CONSTRUCTING AN OPTICAL FUNCTIONAL UNIT

CROSS REFERENCE

This application claims priority to German Application No. 10 2023 118666.3, filed Jul. 14, 2023, the entirety which is hereby incorporated by reference.

FIELD OF THE INVENTION

The invention relates to a method for constructing an optical functional unit containing an optical component, in particular for a lighting device for a vehicle, in which the optical component has a transparent surface, to at least part of which a opaque coating is applied, portions of which are then removed with a laser such that at least one window is created through which the light from at least one light source can pass, and in which the at least one light source is part of a light module.

BACKGROUND OF THE INVENTION

Optical functional units with optical components in the form of optical collimators, for example, are used in lighting devices for vehicles. By way of example, there are optical collimators made entirely of glass placed in front of semiconductor lights such that an image is projected in front of the vehicle by semiconductor lamps. To generate a light/dark boundary for a low beam light, a blind must be placed between the light and the area in front of the vehicle, the edge of which forms the light/dark boundary in the low beam light in the area in front of the vehicle.

Because modern headlamps contain light modules that can be placed in the smallest installation spaces, tolerance deviations in the edges forming the light/dark boundaries in relation to the light sources have a much more significant effect on the light distribution in front of the vehicle, such that the demands on these tolerances increase as the light modules become smaller. It is therefore challenging to create an optical functional unit for vehicle lighting devices with which the light from the light sources entering the optical component can be projected into the area in front of the vehicle with the necessary tolerances. The light/dark boundary plays a special role in this, because the placement of an optical collimator and its dedicated blind with incorrect tolerances can blind oncoming traffic, even with low beams.

Newer designs use transparent coatings on the surface of the optical component through which light passes, which are then partially removed with lasers to create the necessary blind edge of the window in the coating created in this manner.

A method for constructing an optical functional unit with an optical component is disclosed in DE 10 2021 116 638 A1, which is intended in particular for a vehicle lighting device, in which the optical component has a surface through which light passes, to at least part of which an opaque coating is applied, portions of which are then removed with lasers such that at least one window is formed through which the light from a dedicated light source passes. The light source is part of a light module, which is then placed in relation to the optical component. In the method described herein, the window is aligned in relation to reference positions on the optical component, formed by subsections or edges in the grids formed in the optical components during production. This aligns the windows precisely with the actual collimator lenses, but not the light sources, i.e. the LEDs in the light module.

BRIEF SUMMARY OF THE INVENTION

The object of the invention is to align the position of the window in relation to the light sources in the light module with a simple method, in particular such that the greatest possible portion of the light from the light sources passes through the window. This requires precision placement of the windows in relation to the light sources in the light module.

The invention proposes the following method steps: provision of a frame that has at least two reference points, placement of the optical component in the frame, detecting the reference points on the frame with an optical sensor, calculating the position of the window on the surface through which light passes in relation to the reference points using a control unit, removing portions of the opaque coating with lasers to obtain the at least one window, placement of the light module such that it is aligned with the reference points on the frame.

The method according to the invention results in the substantial advantage that the windows on the surface through which light passes are precisely aligned with the light sources in the light module, such that the greatest possible amount of light that can be generated by the light source can pass through the window. These steps do not place the windows in reference to the surface of the optical component, i.e. the optical collimator, but instead place them in relation to the reference points to which the light module, and therefore the light sources, are then aligned.

This does not result in an optimal position of the window in relation to the optical components, in particular the optical collimator, but this can be compensated for when adjusting the module during installation of the optical functional unit, e.g. a headlamp. This ultimately results in an optimal alignment of the windows in relation to the light sources, also resulting in a maximum luminous flux output from the optical functional unit, because less light is unintentionally blocked by the edges of the blind.

The frame has at least two alignment elements with which the optical component is aligned on the frame. The frame can be made of a single piece of molded plastic or metal, and the reference points and/or alignment elements can be calibrated or adjusted after the actual production of the frame. This ensures that the alignment elements are placed precisely in relation to the reference points on the frame. This then results in a very precise placement of the windows in relation to the collimator lenses.

The alignment elements can exhibit a bearing surface on which the optical component can be placed on or in the frame. The surface on the optical component through which light passes is flat, and the optical component can be placed with the alignment elements such that this surface is parallel thereto. In the same manner, the light module, which is also flat, formed in particular by a printed circuit board (PCB) populated with light sources, can also be aligned with the reference points.

The reference points on the frame are advantageously detected by an optical sensor based on an imaging and evaluation thereof. There are other means of detecting the reference points within the framework of the invention, e.g. with tactile methods or methods using a device that is aligned spatially with the reference points, in order to then remove portions the coating on the surface through which light passes with laser beams.

The optical component advantageously remains on the frame after the windows have been created, and is fastened thereto in particular, e.g. using spring clips or clasps. This has the advantage that when the optical component is first placed on the frame, the windows are aligned with the reference points on the frame by the laser processing, whereas if the optical component were removed and replaced, the alignment might become less precise.

After the optical functional unit has been produced, the position of the light sources in the light module can be adjusted in relation to the windows during installation in the optical functional unit, in particular by adjusting their position in a headlamp for a vehicle.

Lastly, execution of the method with a control unit is advantageous, in which the control unit calculates the location and/or position of the windows that are to be formed based on the positions of the reference points detected on the frame, such that the control unit controls the laser beam source for removing the opaque coating and forming the windows based on this calculation. The basis for this is the reference points, at least two of which are detected in a plane such that the windows can be formed in the coating on the surface of the optical component through which light passes in an identical, or at least parallel, plane.

The reference points on the frame can be formed by lugs, and the alignment elements for the optical component can be adjacent thereto, or part thereof. The lugs can be placed in holes or notches in the light module when it is placed on the frame, which then also results in an alignment with the windows.

The present invention also relates to an optical functional unit produced with the method described above. The optical functional unit is distinguished in particular in that when the at least one light source is in use, substantially all of the light, i.e. at least 70%, preferably 80%, ideally 90%, can pass through the dedicated window.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
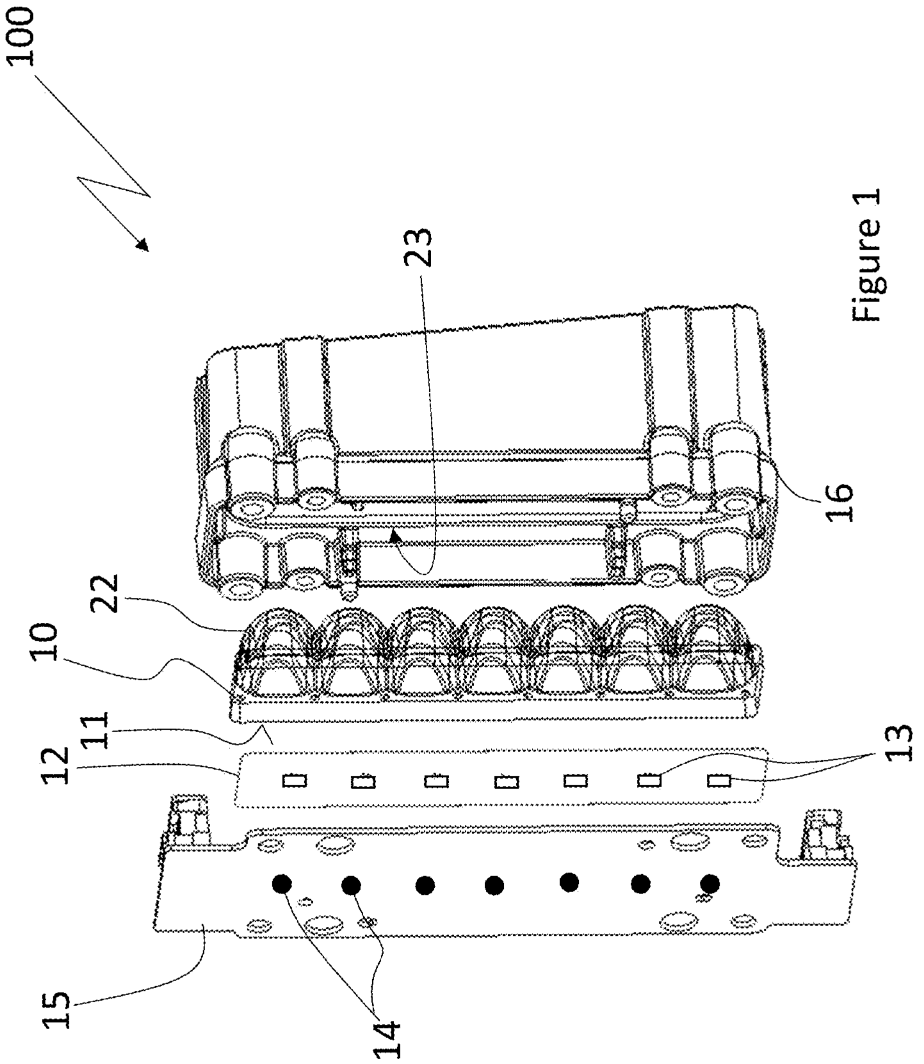
FIG. 1 shows an exploded view of the optical functional unit with the significant components thereof.

FIG. 1 shows an exploded view of the components of the optical functional unit 100. The optical functional unit 100 is supported on a frame 16 with which it can be mounted in the headlamp for a vehicle.

The frame 16 has a receiving space 23 in which the optical component 10 is placed. The optical component 10 in this exemplary embodiment forms an optical collimator with numerous collimator lenses 22, which are adjacent to one another in a row.

An opaque coating 12 is placed on the surface 11 through which light passes, which lies opposite the collimator lenses 22, which is shown as separate from and therefore at a spacing to the surface 11 through which light passes merely for illustrative purposes.

Numerous windows 13 are formed in the opaque coating 12, the positions of which correspond to light sources 14 in a light module 15, which is also shown spaced apart from the coating. The opaque coating 12 and therefore the surface 11 through which light passes faces toward the light module 15 and therefore the light sources 14. When the light sources 14 emit light, it only passes through the surface 11 where the windows are located, because the opaque coating 12 otherwise prevents the passage of light.

The windows 13 are formed in the opaque coating 12 with laser beams, with which the coating 12 is removed from the surface 11 of the optical component 10 through which light passes in a targeted manner. The method for producing the optical functional unit 100 shown herein aligns the windows 13 with the light sources 14 in the light module 15. This should result in a precision placement of the windows 13 in relation to the light sources 14, such that the maximum luminous flux output can be obtained, in particular when the optical functional unit 100 is later adjusted in the production process. This shall be explained in reference to the subsequent drawings.

Figure 2:
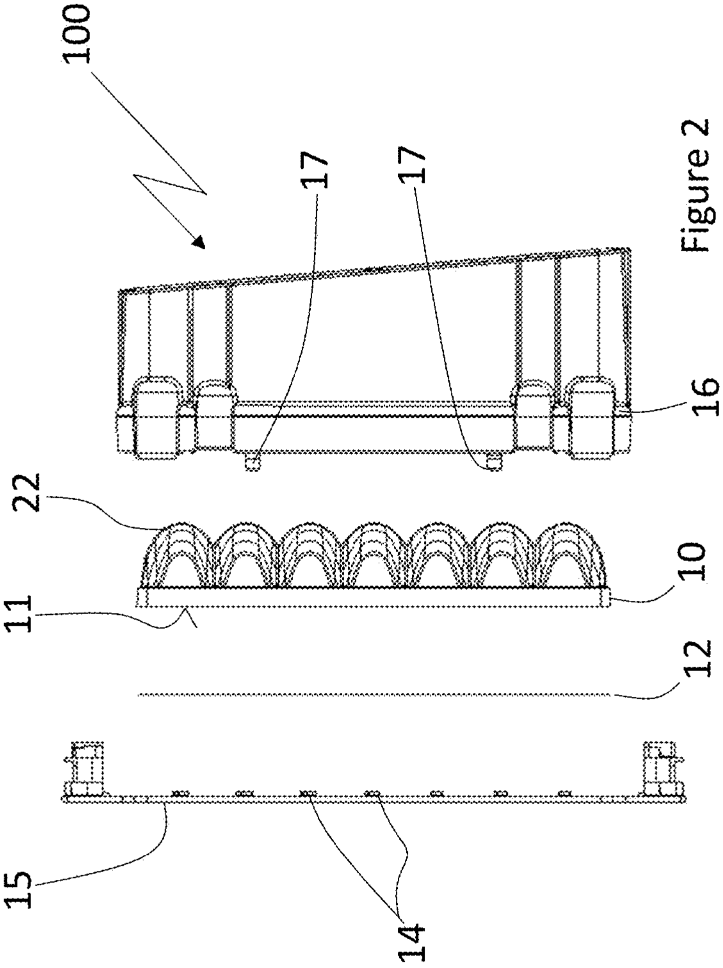
FIG. 2 shows a side view of the components of the optical functional unit.

FIG. 2 shows the optical functional unit 100 with the optical component 10, comprising numerous collimator lenses 22 and the opaque coating 12, which is only shown separated from the surface 11 through which light passes for illustrative purposes, as well as the light module 15 with the light sources 14. Each light source 14 has a dedicated collimator lens 22 with which it is aligned in the optical component 10.

There are two reference points 17 formed on the frame 16, by way of example, which are formed by lugs protruding from the frame 16.

Figure 3:
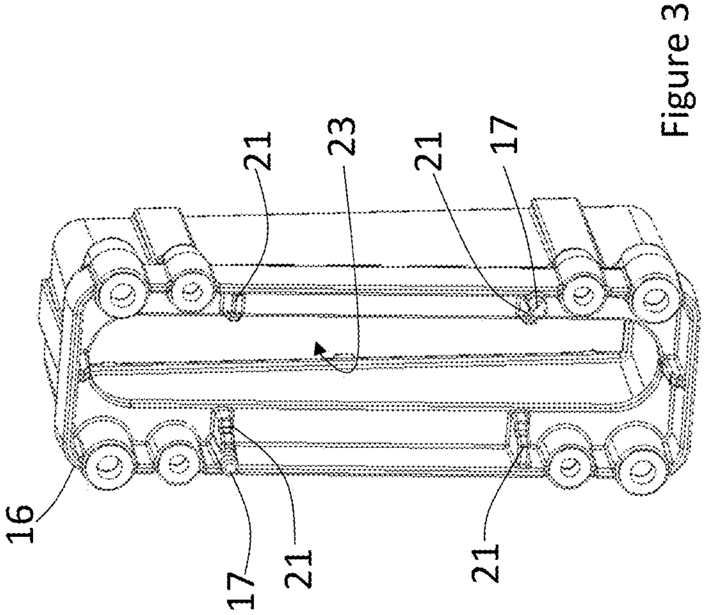
FIG. 3 shows a perspective view of the frame with the reference points thereon.

FIG. 3 shows a perspective view of the frame 16, which has two reference points 17, each of which has one of the four alignment elements 21. The reference points 17 and alignment elements 21 are distributed about the receiving space 23 in which the optical component 10 is placed on the frame 16.

To place the windows 13 as precisely as possible in relation to the light sources 14, the optical component 10 is first placed in the receiving space 23 in the frame 16, as can be seen by viewing FIGS. 1, 2 and 3 collectively. The alignment elements 21 align the optical component 10 such that the collimator lenses 22 assume the dictated position in relation to the reference points 17. The reference points 17 are subsequently detected by an optical sensor and the positions of the windows 13 on the surface 11 through which light passes are calculated in relation to the reference points 17 by a control unit. Portions of the opaque coating 12 are then removed with a laser beam to create the windows 13.

Once the windows 13 are formed on the optical component 10, it remains in the frame 16, and the light module 15 containing the light sources 14 is subsequently placed thereon, which is then also aligned by the reference points 17 or the alignment elements 21. The light module 15 is preferably aligned by the reference points 17 in that it has holes or notches that the reference points 17 formed by lugs can engage in. This results in a precise alignment of the light module 15 in the flat plane such that the light sources 14 populating the surface of the light module 15, in particular a PCB, can be placed precisely in relation to the windows 13.

Figure 4:
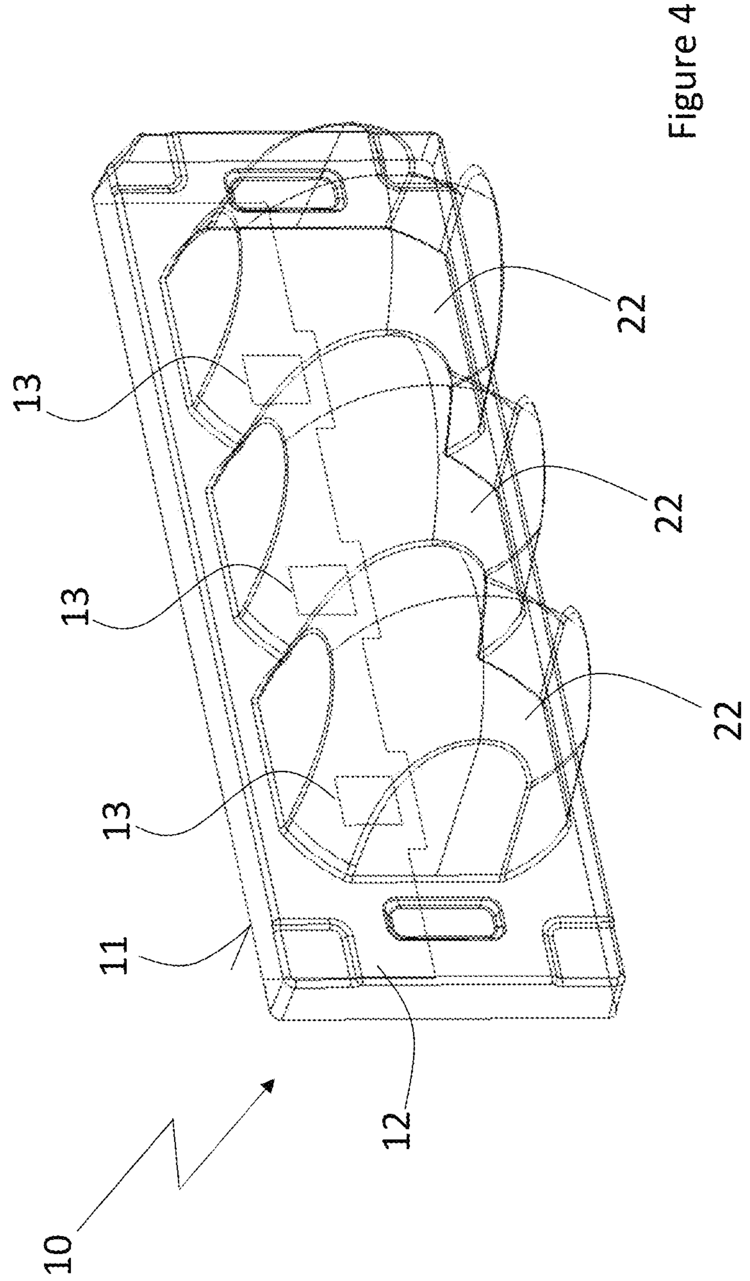
FIG. 4 shows a perspective view of the optical component in the form of an optical collimator.

FIG. 4 shows a perspective view of an optical component 10 designed by way of example as an optical collimator with numerous collimator lenses 22. The opaque coating 12 on the surface 11 through which light passes is behind the collimator lenses 22, and portions of the coating 12 are removed where light from the light sources 14 is supposed to pass through the surface 11 such that this light can subsequently enter the collimator lenses 22.

Figure 5:
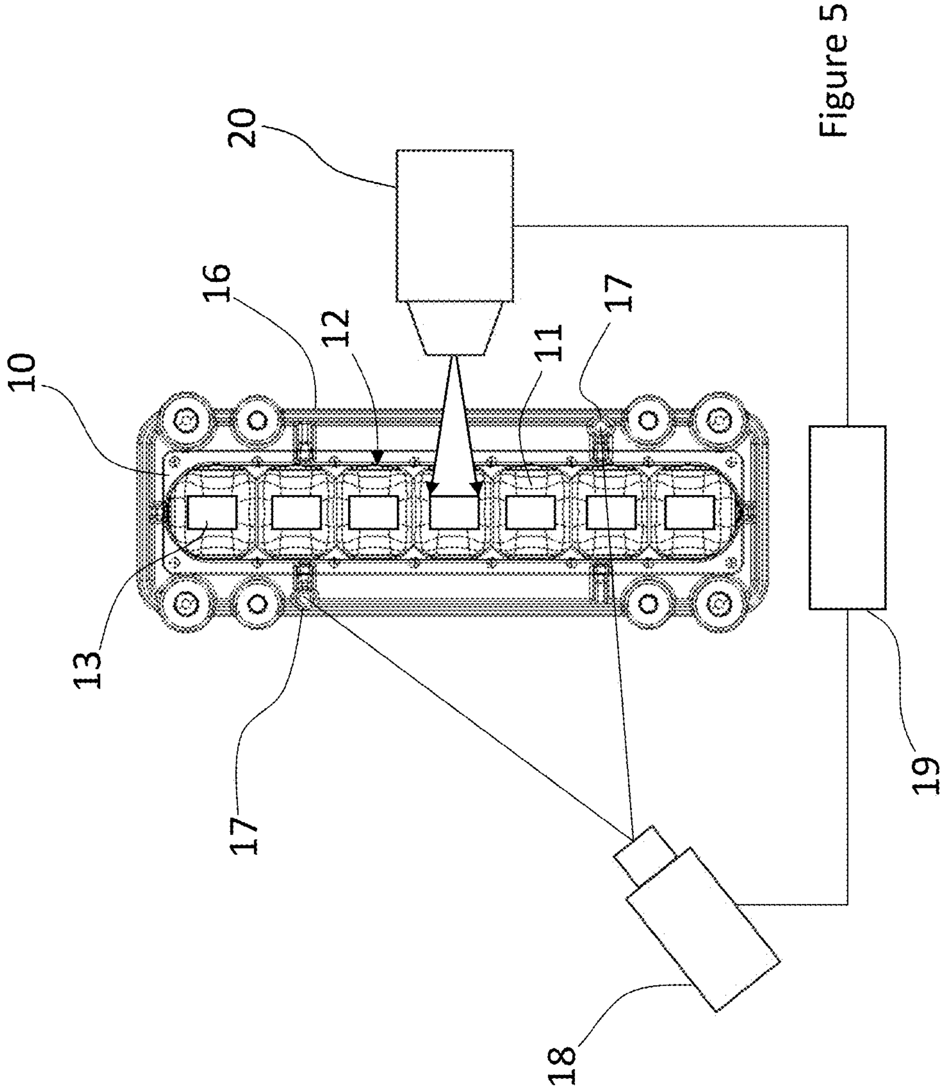
FIG. 5 shows a schematic illustration of the processing of the opaque coating, in which the detection of the reference points by a sensor, and the processing of the coating with a laser beam are shown.

FIG. 5 shows a schematic illustration of the frame 16 with an optical component 10 placed thereon, in which the windows 13 are formed at the back of the surface 11 of the optical component 10 through which light passes. This illustration shows the sensor 18, e.g. a camera connected to an image evaluation unit, with which the precise position of the reference points 17 can be detected. The positions the windows 13 must assume on the optical component 10 such that that they are aligned with the positions of the light sources when the light module is put in place are calculated by the control unit 19. The control unit 19 can then control the laser beam source 20 such that the windows 13 are then formed in the right places when these portions of the opaque coating 12 are removed.

Figure 6:
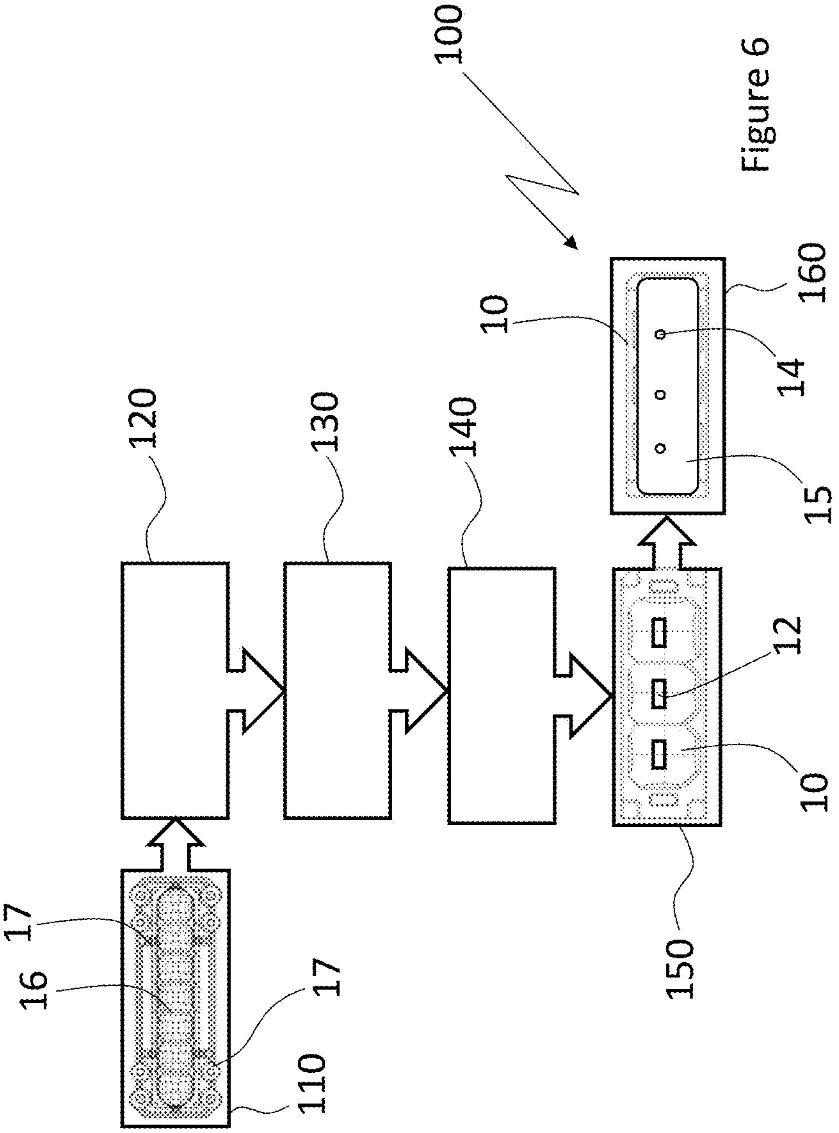
FIG. 6 shows a schematic illustration of the sequence of the method according to the invention for producing the optical functional unit.

FIG. 6 shows the steps of the method in which a frame 16 that has at least two reference points 17 is provided 110, followed by a the step 120 in which the optical component is placed on the frame, followed by the step 130 in which the reference points on the frame are detected with a sensor, followed by the step 140 in which the positions of the windows on the surface through which light passes are calculated in relation to the reference points by a control unit, followed by the step 150 in which portions of the opaque coating 12 are removed with the laser beam to obtain the at least one window 13, and lastly followed by the step 160 in which the light module 15 is placed on the frame 16 in alignment with the reference points 17 in order to obtain the optical functional unit 100.

The invention is not limited to the preferred exemplary embodiment described above. A number of variations are conceivable with which the solution described herein is also obtained with fundamentally different embodiments. All of the features and/or advantages that can be derived from the claims, description or drawings, including structural details, spatial configurations, and steps of the method, may be regarded as substantial to the invention in and of themselves and in various combinations thereof.

LIST OF REFERENCE SYMBOLS

10 optical component
11 surface through which light passes
12 opaque coating
13 window
14 light source
15 light module
16 frame
17 reference point
18 sensor
19 control unit
20 laser beam source
21 alignment element
22 collimator lens
23 receiving space
100 optical functional unit
110 provision
120 placement
130 detection
140 calculation
150 removal

The invention claimed is:

1. A method for constructing an optical functional unit that has an optical component, the optical component having a surface through which light passes, to at least part of which surface an opaque coating is applied, wherein portions of the opaque coating are to be removed from the surface such that at least one window is formed through which the light from at least one light source can pass, wherein the at least one light source is part of a light module, and the method comprises at least the following steps:

providing a frame that has at least two reference points;
placing the optical component on the frame;
detecting the reference points on the frame with an optical sensor;
calculating the positions of the windows on the surface through which light passes in relation to the reference points with a control unit;
removing portions of the opaque coating using a laser beam source to create the at least one window; and
placing the light module in alignment with the reference points on the frame.

2. The method according to claim 1, wherein the frame has at least two alignment elements, with which the optical component is aligned on the frame.

3. The method according to claim 2, wherein the alignment elements have a bearing surface on which the optical component is placed.

4. The method according to claim 1, wherein the reference points are detected on the frame by an optical sensor based on an imaging and image evaluation.

5. The method according to claim 1, wherein the optical component remains on the frame after the windows have been formed.

6. The method according to claim 1, wherein a deviation in the position of the light sources in relation to the windows is compensated for by an adjustment of the optical functional unit during installation.

7. The method according to claim 1, wherein the method is executed with a control unit with which the location and/or position of the windows is calculated on based on the reference points on the frame, and the control unit controls the laser beam source to remove the opaque coating and form the windows based on the calculation.

8. The method according to claim 1, wherein the reference points on the frame are formed by lugs, and the alignment elements for the optical component are adjacent to the lugs, or part thereof.

9. An optical functional unit produced with according to the method of claim 1.

10. The optical functional unit according to claim 9, wherein when the at least one light source is in use, the light passes substantially entirely through the dedicated window.

* * * * *